UNITED STATES PATENT OFFICE.

JAMES GREENE, OF PROVIDENCE, RHODE ISLAND.

IMPROVEMENT IN LOTIONS FOR PROTECTING ANIMALS AGAINST FLIES.

Specification forming part of Letters Patent No. 120,191, dated October 24, 1871.

*To all whom it may concern:*

Be it known that I, JAMES GREENE, of the city and county of Providence, in the State of Rhode Island, have invented and discovered a new and useful Lotion for Protecting Animals from Flies; and I do hereby declare that the following is a full and complete description of, and the manner of compounding, the same.

My purpose is to make a composition which from its harmless character can be safely used as a lotion for animals, and which will possess the property of repelling flies.

I have discovered that the vegetable properties of onions and horse-chestnuts when combined effect this result in a remarkable way, and with the advantage that the materials from which the same can be made are easily obtained by farmers.

My formula for preparing the composition is to put one-half of a pound of mashed onions and one-quarter of a pound of mashed horse-chestnuts in a gallon of water and simmer them over a moderate fire for an hour, or until all the properties of the onions and chestnuts are extracted. The fluid remaining should then be strained through a coarse cloth or fine sieve, and when cool it is fit to be applied to the coats of animals. The precise proportions above given are not material to be observed, but enough of both the vegetable extracts above given should be used to strongly impregnate the water.

I have found from trial that the first application of the lotion to the coat of an animal will act as a preventive against flies for three days. A repetition of the application after the hair has been once thoroughly washed with it will protect the animal for a much longer time before its effect is lost.

What I claim as my invention, and desire to secure by Letters Patent, is—

The lotion for animals, to prevent the attacks of flies, made of the materials hereinbefore stated, substantially as described.

JAMES GREENE.

Witnesses:
  JOHN D. THURSTON,
  PETER F. HUGHES.

(98)